United States Patent
Tenny et al.

(10) Patent No.: US 8,520,502 B2
(45) Date of Patent: Aug. 27, 2013

(54) SYSTEMS AND METHODS FOR MANAGING RRC CONNECTIONS IN WIRELESS COMMUNICATIONS

(75) Inventors: Nathan Edward Tenny, Poway, CA (US); Masato Kitazoe, Hachiouji (JP)

(73) Assignee: QUALCOMM Incorporated, San Diego, CA (US)

(*) Notice: Subject to any disclaimer, the term of this patent is extended or adjusted under 35 U.S.C. 154(b) by 779 days.

(21) Appl. No.: 12/476,038

(22) Filed: Jun. 1, 2009

(65) Prior Publication Data
US 2009/0296675 A1    Dec. 3, 2009

Related U.S. Application Data

(60) Provisional application No. 61/057,919, filed on Jun. 2, 2008.

(51) Int. Cl.
*H04W 4/00* (2009.01)

(52) U.S. Cl.
USPC .......................................... 370/216; 370/328

(58) Field of Classification Search
None
See application file for complete search history.

(56) References Cited

U.S. PATENT DOCUMENTS

| | | | |
|---|---|---|---|
| 6,763,112 B1* | 7/2004 | Haumont | 380/247 |
| 6,990,343 B2* | 1/2006 | Lefkowitz | 455/436 |
| 7,035,284 B2* | 4/2006 | Willenegger et al. | 370/470 |
| 7,366,496 B2* | 4/2008 | Vialen et al. | 455/410 |
| 7,995,994 B2* | 8/2011 | Khetawat et al. | 455/410 |
| 8,116,810 B2* | 2/2012 | Kim et al. | 455/552.1 |
| 8,355,377 B2* | 1/2013 | Chapman | 370/330 |
| 2002/0159444 A1* | 10/2002 | Vialen et al. | 370/352 |
| 2006/0008256 A1* | 1/2006 | Khedouri et al. | 386/124 |
| 2007/0217333 A1 | 9/2007 | Seo et al. | |
| 2007/0258591 A1* | 11/2007 | Terry et al. | 380/247 |
| 2008/0261632 A1* | 10/2008 | Hind et al. | 455/466 |
| 2010/0144313 A1* | 6/2010 | Chun et al. | 455/410 |

FOREIGN PATENT DOCUMENTS

| | | |
|---|---|---|
| CN | 1535909 A | 10/2004 |
| CN | 1716951 A | 1/2006 |
| CN | 1898904 A | 1/2007 |
| JP | 2002540693 | 11/2002 |
| JP | 2003524336 A | 8/2003 |
| WO | 2007072814 A1 | 6/2007 |

OTHER PUBLICATIONS

3GPP TSG RAN WG2 #62, Potential problem of handover procedure, NTT DoCoMo, Inc., Kansas City, USA, May 5-9, 2008, Tdoc-R2-082622.

(Continued)

*Primary Examiner* — Hassan Kizou
*Assistant Examiner* — Roberta A Shand
(74) *Attorney, Agent, or Firm* — Kam T. Tam

(57) ABSTRACT

Systems and methodologies are described that facilitate selective release of mobile devices using conflicting identifiers when communicating with an access point. The access point can detect the conflicting identifier and transmit a selective release message to the mobile devices. The selective release message can include a disambiguation identifier so the appropriate mobile device can identify that it is incorrectly connected to the access point and can release its connection. The disambiguation identifier can be one or more unique aspects of the correctly or incorrectly connected mobile device, such as an identifier, previous message related aspects, whether a security or context check can be decoded, etc. Thus, connection of the incorrectly connected mobile device can be released without additionally releasing the correctly connected mobile device.

49 Claims, 13 Drawing Sheets

(56) References Cited

OTHER PUBLICATIONS

International Search Report and Written Opinion—PCT/US2009/046019—ISA/EPO—Oct. 23, 2009.
Qualcomm Europe: "Connection release in case of C-RNTI collision" 3GPP Draft; R2-082985, 3rd Generation Partnership Project (3GPP), Mobile Competence Centre ; 650, Route Des Lucioles; F-06921 Sophia-Antipolis Cedex; France, vol. RAN WG2, no. Sophia Antipolis, France; Jun. 2, 2008, XP050142170 [retrieved on Jun. 2, 2008] the whole document.
Taiwan Search Report—TW098118262—TIPO—Sep. 27, 2012.

* cited by examiner

SYSTEMS AND METHODS FOR MANAGING RRC CONNECTIONS IN WIRELESS COMMUNICATIONS

CROSS-REFERENCE

This application claims the benefit of U.S. Provisional Application Ser. No. 61/057,919, filed Jun. 2, 2008, and entitled "A METHOD AND APPARATUS FOR MANAGING RRC CONNECTION IN WIRELESS COMMUNICATION SYSTEM," the entirety of which is incorporated herein by reference.

BACKGROUND

I. Field

The present disclosure relates generally to wireless communications and more specifically to managing radio resource control (RRC) connections.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), etc.

Generally, wireless multiple-access communication systems may simultaneously support communication for multiple mobile devices. Each mobile device may communicate with one or more access points (e.g., base stations, femtocells, picocells, relay nodes, and/or the like) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

In addition, mobile devices can connect to access points over a radio resource control (RRC) layer. Moreover, mobile devices can travel throughout a wireless network handing over communications to disparate access points to facilitate seamless network access. During such handovers, which can also be referred to as cell reselection, the source and target access points can communicate to effectuate the handover, and the mobile devices can receive an identifier or other information specific to the target access point used to communicate therewith. It is possible, however, that the mobile device hands over or attempts connection establishment to the wrong access point (e.g., due to confusion in access point identifiers or pilot pseudo-noise (PN)).

It is further possible that the mobile device is assigned an identifier that has already been allocated to a disparate mobile device by the wrongly connected to access point. Thus, the identifiers can conflict causing confusion between the mobile devices and access point receiving communications therefrom. Previous attempts to cure this confusion include transmitting a connection release message related to the identifier, which causes both the mobile device correctly communicating with the access point and the mobile device communicating incorrectly with the access point to release connection.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

In accordance with one or more embodiments and corresponding disclosure thereof, various aspects are described in connection with facilitating providing selective release of mobile device resources where a mobile device communicates with an incorrect access point using an identifier conflicting with a mobile device already connected to the access point. In one example, the access point can detect incorrect communication from the mobile device based at least in part on determining that the communication is not of the type expected from the mobile device currently connected. Accordingly, the access point can send a selective release message causing only the mobile device incorrectly connected to disconnect from the access point. In an example, the selective release message can be an existing connection release message with a disambiguation identifier so that the connected mobile device does not process the message (instead, only the incorrectly connected mobile device does), a newly defined message, a context provided elsewhere, and/or the like. Thus, selective release can be provided for incorrectly connecting mobile devices without disturbing currently connected mobile devices.

According to related aspects, a method for performing selective release in wireless communications is provided. The method can include receiving a selective release notification from an access point that disambiguates incorrectly connected mobile devices from correctly connected ones. The method can further include determining whether connection to the access point is incorrect based at least in part on the selective release notification and releasing connection to the access point based at least in part on determining that connection to the access point is incorrect.

Another aspect relates to a wireless communications apparatus. The wireless communications apparatus can include at least one processor configured to obtain a selective release notification from an access point and detect whether the selective release notification applies to the wireless communications apparatus. The processor is further configured to release connection from the access point based at least in part on detecting whether the selective release notification applies. The wireless communications apparatus also comprises a memory coupled to the at least one processor.

Yet another aspect relates to an apparatus that facilitates releasing communications in wireless networks. The apparatus can comprise means for receiving a selective release message from an access point and means for determining whether connection to the access point is incorrect based at least in part on the selective release message. The apparatus can additionally include means for releasing connection from the access point according to whether connection to the access point is incorrect.

Still another aspect relates to a computer program product, which can have a computer-readable medium including code for causing at least one computer to receive a selective release notification from an access point that disambiguates incorrectly connected mobile devices. The computer-readable medium can also comprise code for causing the at least one computer to determine whether connection to the access point is incorrect based at least in part on the selective release notification and code for causing the at least one computer to release connection to the access point based at least in part on determining whether connection to the access point is incorrect.

Moreover, an additional aspect relates to an apparatus including a selective release message component that receives a selective release message from an access point and a disambiguation identifier component that discerns whether connection to the access point is incorrect based at least in part on the selective release message. The apparatus can further include a release component that releases connection from the access point according to whether connection to the access point is incorrect.

According to further aspects, a method for selectively releasing mobile devices with conflicting identifiers is provided. The method can include receiving from a mobile device an access request comprising an identifier and determining that the identifier conflicts with an assigned identifier previously allocated to a connected mobile device. The method can also include transmitting a selective release message to the mobile device and connected mobile device based at least in part on the conflict between the identifier and the assigned identifier.

Another aspect relates to a wireless communications apparatus. The wireless communications apparatus can include at least one processor configured to obtain an access request comprising an identifier from a mobile device and detect a conflict between the identifier and an assigned identifier allocated to a connected mobile device. The processor is further configured to transmit a selective release message corresponding to the conflicting identifier and assigned identifier. The wireless communications apparatus also comprises a memory coupled to the at least one processor.

Yet another aspect relates to an apparatus that facilitates requesting selective release of one or more mobile devices. The apparatus can comprise means for receiving communications comprising an identifier from a mobile device and means for determining that the identifier conflicts with a disparate identifier assigned to a connected mobile device. The apparatus can additionally include means for transmitting a selective release message based at least in part on the identifier.

Still another aspect relates to a computer program product, which can have a computer-readable medium including code for causing at least one computer to receive an access request from a mobile device comprising an identifier. The computer-readable medium can also comprise code for causing the at least one computer to determine that the identifier conflicts with an assigned identifier previously allocated to a connected mobile device. The computer-readable medium can further include code for causing the at least one computer to transmit a selective release message to the mobile device and connected mobile device based at least in part on the conflict between the identifier and the assigned identifier.

Moreover, an additional aspect relates to an apparatus. The apparatus can include a transceiver component that receives communications comprising an identifier from a mobile device and an incorrect communication detect component that determines the identifier conflicts with a disparate identifier assigned to a connected mobile device. The apparatus can further include a selective release message component that generates a selective release message based at least in part on the identifier, wherein the transceiver component that transmits the selective release message to the mobile device and connected mobile device.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed, and the described embodiments are intended to include all such aspects and their equivalents.

DETAILED DESCRIPTION

Figure 1:
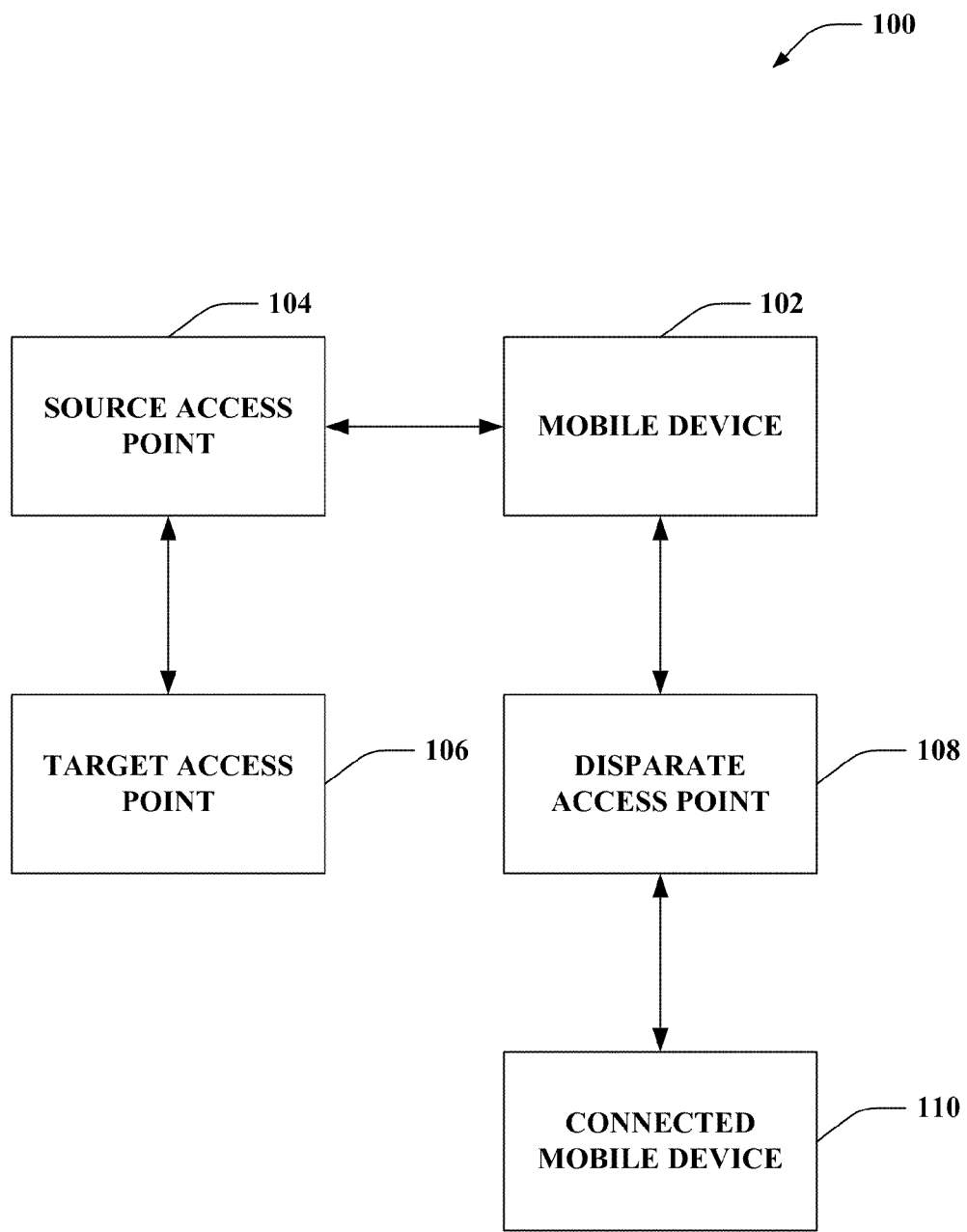
FIG. 1 is a block diagram of a system for communicating selective release messages in a wireless network.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates an example wireless network 100 that facilitates providing selective release of mobile devices communicating with an access point using a conflicting identifier. Network 100 includes a mobile device 102 that communicates with a source access point 104 to receive access to a wireless network and to handover mobile device communications to a target access point 106. In addition, a disparate access point 108 is illustrated that provides wireless network access to a connected mobile device 110. As described, the mobile device 102 can communicate with the source access point 104 using an identifier local to the source access point 104, such as a cell radio network temporary identifier (C-RNTI). Similarly, the connected mobile device 110 can communicate with the disparate access point 108 using an identifier local to the disparate access point 108.

According to an example, the mobile device 102 can travel over a wireless network handing over communications to disparate access points to facilitate seamless network access. In one example, the source access point 104 can communicate with the target access point 106 to handover communications from the mobile device 102 thereto. This can be initiated by the mobile device 102, in one example. As part of the handover procedure, the target access point 106 can allocate an identifier for the mobile device 102 to facilitate immediate communication with the target access point 106. In one example, the target access point 106 can provide the identifier to the mobile device 102 outright or via the source access point 104.

The mobile device 102 can initialize communications with the target access point 106 using the temporary identifier (not shown). In an example, however, the mobile device 102 can initialize communications with disparate access point 108 instead of the target access point 106. This can be caused by various factors, such as confusion of access point identifiers related to the target access point 106 and disparate access point 108. In one example, the access points 106 and 108 can be part of a heterogeneous deployment and unaware of the conflict in identifiers. The identifier, for example, can relate to a physical cell identifier, pilot pseudo-noise (PN), etc., which can be ambiguous among given access points.

In this case, the disparate access point 108 can detect the incorrect communication initialization by the mobile device 102 based on the identifier. Where, however, the identifier assigned to the mobile device 102 matches the identifier assigned to the connected mobile device 110 by the disparate access point 108, the disparate access point 108 can determine the incorrect communication initialization based at least in part on data received from the mobile device 102. For example, the mobile device 102 likely transmits a communication establishment message to the disparate access point 108 (e.g., radio resource control (RRC) CONNECTION SETUP COMPLETE or some other message relating to the access procedure) comprising the identifier. Where the disparate access point 108 has established connection with the connected mobile device 110, it does not expect to receive such messages from the connected mobile device 110. Thus, this can indicate an incorrect communication on the part of the mobile device 102.

In this regard, the disparate access point 108 can notify the mobile device 102 that it is attempting connection establishment with the wrong access point. In one example, this can be accomplished by sending a selective release notification to the mobile device. This can include, for example, a connection release message (e.g., RRC CONNECTION RELEASE) that indicates to the mobile device 102 to release the connection; this message, however, can be transmitted with a disambiguation identifier and/or an indication that it is selective, so that the connected mobile device 110 does not also attempt to release the connection. The selective release notification can additionally include a newly defined message (e.g., RRC CONDITIONAL RELEASE MESSAGE), a security protected or context check message (e.g., a COUNTER CHECK), and/or the like.

Figure 2:
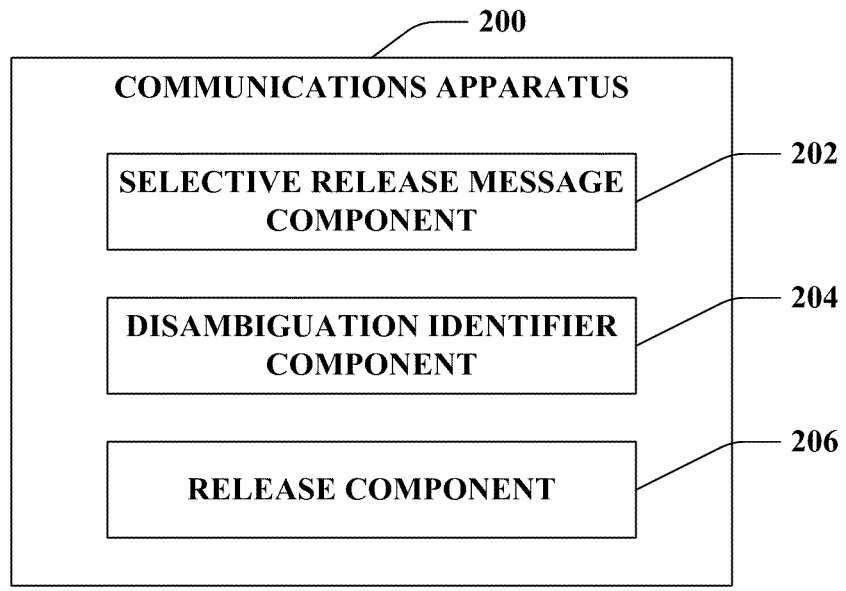
FIG. 2 is an illustration of an example communications apparatus for employment within a wireless communications environment.

Referring next to FIG. 2, a communications apparatus 200 that can participate in a wireless communications network is illustrated. The communications apparatus 200 can be a mobile device, access point, a portion thereof, or substantially any device that can receive access to a wireless network. The communications apparatus 200 can include a selective release message component 202 that can receive a selective release message, a disambiguation identifier component 204 that can determine whether the selective release message applies to the communications apparatus 200, and a release component 206 that can release communications based on the selective release message.

According to an example, the selective release message component 202 can receive a selective release notification. This can be received by an entity, such as an access point (not shown) with which the communications apparatus 200 requested connection establishment, as described. In an example, the selective release notification can be a connection release message, such as an RRC CONNECTION RELEASE, which further comprises a disambiguation identifier and/or an indication that it is a selective message. In one example, a bit indicating presence of the disambiguation identifier and/or detection of the disambiguation identifier (e.g., by the disambiguation identifier component 204) can indicate that the message is selective.

Where the message is a selective release message, the disambiguation identifier component 204 can determine the related disambiguation identifier in the message, which is specific to a correctly or incorrectly connected communications apparatus. For example, this disambiguation identifier can be a signature or checksum of the last or a previous uplink message received by the entity transmitting the selective release message from the communications apparatus 200 or a disparate communications apparatus for which release is requested or not requested. Where the signature or checksum relates to a communications apparatus 200 for which release is requested, for example, the disambiguation identifier component 204 can compare the signature or checksum to that of a previously transmitted message. If it matches a previous message, the release component 206 can release communications from the entity transmitting the selective release message. Similarly, where the signature or checksum relates to a communications apparatus 200 for which release is not requested, if it matches a previous message from the communications apparatus 200, the communications apparatus 200 can continue communications, or else release communications via the release component 206 if it does not match. It is to be appreciated that multiple previous messages can be checked by the disambiguation identifier component 204 to account for the communications apparatus 200 transmitting another uplink message before receiving the selective release message.

In yet another example, the disambiguation identifier can be substantially any function of a previously transmitted message, such as a cyclic redundancy check (CRC), RRC transaction identifier, sequence number from a lower layer, physical layer aspects, such as a hopping pattern, spreading code, and/or the like, etc. In another example, the disambiguation identifier related to the selective release message can be a security or context check sent by the entity sending the selective release message. For example, a communications apparatus correctly communicating with the entity can decode the security or context check, while an incorrectly communicating apparatus could not. Thus, if the disambiguation identifier component 204 cannot decode the security or context check upon receiving the selective release message at the selective release message component 202, the release component 206 can release communication from the entity. Moreover, in an example, the disambiguation identifier can be an international mobile subscriber identity (IMSI), system architecture evolution (SAE) temporary mobile subscriber identity (S-TMSI), packet TMSI (P-TMSI), and/or the like, which can be derived from the core network.

In yet another example, the selective release message can be a newly defined message specifically for indicating selective release to the communications apparatus 200. In another example, the selective release message can be the security or context check itself, as described above. Thus, instead of merely being a disambiguation identifier, a security check can be sent to the communications apparatus 200, and the selective release message component 202 can receive the security check. If the communications apparatus 200 cannot decode the check, the release component 206 can release communications from the entity.

Figure 3:
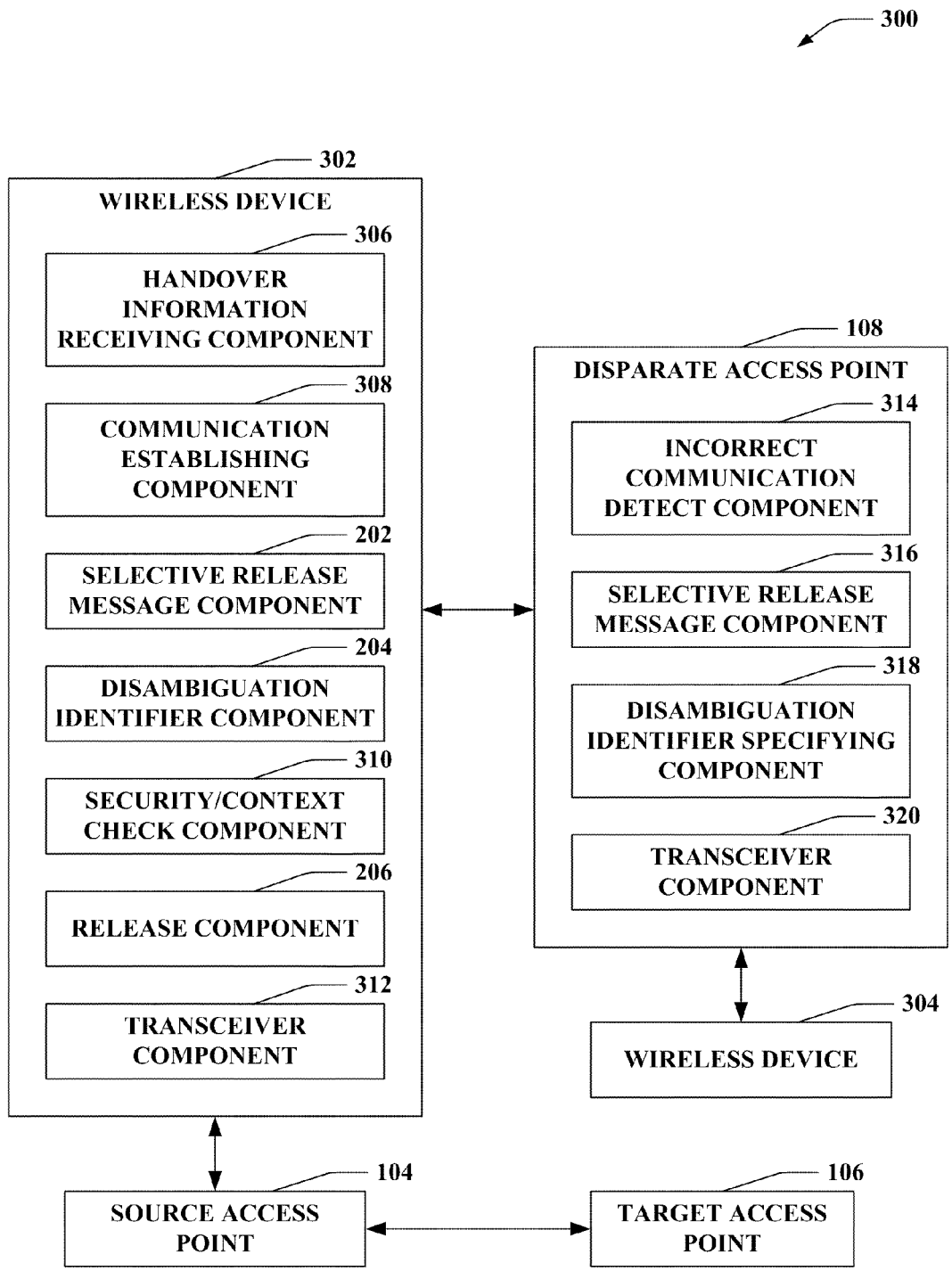
FIG. 3 illustrates an example wireless communication network that effectuates utilizing selective release messages for mobile devices using conflicting identifiers.

Now referring to FIG. 3, illustrated is a wireless communications system 300 that facilitates selectively releasing incorrectly connecting mobile devices from access points. Wireless device 302 and 304 and/or access points 104, 106, and 108 can be a mobile device (including not only independently powered devices, but also modems, for example), a base station, and/or portion thereof. Moreover, system 300 can be a MIMO system and/or can conform to one or more wireless network system specifications (e.g., EV-DO, 3GPP, 3GPP2, 3GPP LTE, WiMAX, etc.). Also, the components and functionalities shown and described below in the wireless device 302 can be present in wireless device 304; similarly the components and functionalities shown and described in the disparate access point 108 can be present in the source access point 104 and/or target access point 106. In one example, the configuration depicted excludes these components for ease of explanation.

Wireless device 302 can include a handover information receiving component 306 that can obtain handover parameters, a communication establishing component 308 that can initialize communications with an access point, a selective release message component 202 that can receive a selective release notification from an access point as described, a disambiguation identifier component 204 that can determine whether the selective release notification applies to the wireless device, a security/context check component 310 that can attempt to decode a security or other type of context check, a release component 206 that can release access point communications, and a transceiver component 312 that communicate information to various wireless network devices. The wireless device 302 can communicate with a source access point 104 to receive wireless network access, and the source access point 104 can communicate with a target access point 106 to facilitate handing over wireless device 302 communications to the target access point 106.

Disparate access point 108 can provide wireless network access to the wireless device 304. Disparate access point 108 can include an incorrect communication detect component 314 that can determine when a wireless device incorrectly accesses the disparate access point 108, a selective message release component 316 that generates a command to release communication from the disparate access point 108, a disambiguation identifier specifying component 318 that indicates a disambiguation identifier to single out the incorrectly connecting wireless device from a connected wireless device using the same identifier, and a transceiver component 320 that transmits messages in a wireless network.

According to an example, as described, the wireless device 302 can receive wireless network access from the source access point 104 and can initiate handover to the target access point 106. Source access point 104 can communicate with target access point 106, in one example, to provide context information regarding the wireless device 302 and to retrieve an identifier local to the target access point 106 that the wireless device 302 is assigned for communicating therewith. The handover information receiving component 306 can obtain the identifier from the source access point 104 or target access point 106. Accordingly, the communication establishing component 308 can initialize communications with a target access point using the identifier. In this example, however, the communication establishing component 308 can attempt to initialize connection with the disparate access point 108 using the identifier. This can occur, for example, where the disparate access point 108 has the same or similar access point identifier as the target access point 106 (e.g., in a heterogeneous deployment).

The incorrect communication detect component 314 can determine that the wireless device 302 has erroneously attempted connection with the disparate access point 108. In one example, this can be based on the identifier utilized by the communication establishing component 308 where it matches an identifier not assigned by the disparate access point 108, in which case the disparate access point can merely send a regular release message to the wireless device 302. In another example, however, the identifier can conflict with an identifier assigned by the disparate access point 108 to the wireless device 304. In this example, the incorrect communication detect component 314 can determine that the wireless device 302 is erroneously accessing the disparate access point 108 based at least in part on evaluating a message sent by the wireless device 302. For example, where the communication establishing component 308 is attempting to erroneously complete handover to the disparate access point 108 (as opposed to the target access point 106), it typically sends a connection complete message (e.g., RRC CONNECTION SETUP COMPLETE), which the disparate access point 108 would not expect from the wireless device 304 already connected to the disparate access point 108. The incorrect communication detect component 314 can discover this inconsistency and determine that the identifier is being used both by the connected wireless device 304 and erroneously connecting wireless device 302.

In this regard, the selective release message component 316 can generate a selective release message for transmission to the wireless devices 302 and 304 utilizing the conflicting identifier to communicate with the disparate access point 108. As described, in one example, this message can be a currently defined release message, such as RRC CONNECTION RELEASE, with parameters corresponding to a unique disambiguation identifier related to the wireless device 302 or wireless device 304 and/or an indication that the message is a such a selective release (as opposed to just a general connection release message). In an example, the indication that the message is a selective release can be the fact that the disambiguation identifier is present in the message; in another example, it can be an explicit bit or substantially any indication (e.g., an indication related to physical layer properties of the message, etc.).

The disambiguation identifier specifying component 318 can insert a disambiguation identifier in the selective release message. As described, this can relate to a checksum or signature of a previous message transmitted by the incorrectly communicating wireless device 302 or correctly communicating wireless device 304. In this example, the transceiver component 320 can transmit the message to the wireless devices 302 and 304. At wireless device 302, the selective release message component 202 can receive the message, determine it is a selective release message (based on the presence of a related bit and/or of a disambiguation identifier), and leverage the disambiguation identifier component 204 to extract the disambiguation identifier. The disambiguation identifier component 204 can further compare the disambiguation identifier to one or more previous message signatures or checksums determined at the wireless device 302. If the disambiguation identifier is a message property of a device that is incorrectly communicating, and the disambiguation identifier component 204 determines it matches a previous message of the wireless device 302, the release component 206 can generate a message to release communication from the disparate access point 108, and the transceiver component 312 can transmit a related message to the disparate access point 108. As described, a plurality of previous messages can be checked by the disambiguation identifier component 204 to support the case where the wireless device 302 (or component thereof) sends a new message to the disparate access point 108 without first receiving the selective release message.

In another example, where the disambiguation identifier is a message property of a device determined to be correctly communicating, and the disambiguation identifier component 204 finds a match, no action can be taken by the wireless device 302 except continuing to communicate with the disparate access point 108. It is to be appreciated that in other examples above, the wireless device 302 is described as the incorrectly connecting mobile device; in this example, however, the wireless device 302 would be the correctly connected wireless device, as identified by the disambiguation identifier component 204. Where the wireless device 304 has the respective components and functionalities, in this example, it would not find a matching message and would release its connection, as described.

In another example, the disambiguation identifier specifying component 318 can additionally or alternatively indicate a security or context check as the disambiguation identifier. In one example, the explicit security or other context can be indicated, which the disambiguation identifier component 204 can compare to a utilized security or other context. If match or no match, depending on the algorithm as described, the release component 206 can release connection from the disparate access point 108 and/or the transceiver component 312 can transmit a related message. Moreover, the disambiguation identifier can be an IMSI, S-TMSI, P-TMSI, and/or the like, which the disambiguation identifier specifying component 318 can receive from a core wireless network (not shown) connected to the disparate access point 108.

In yet another example, a newly defined message can be utilized to indicate selective release. For example, an RRC CONDITIONAL RELEASE MESSAGE can be defined. Where the incorrect communication detect component 314 encounters a situation for selective release, as described, the selective release message component 316 can generate the selective release message and the transceiver component 320 can transmit the message at least to the wireless device 302. It is to be appreciated that the disambiguation identifier specifying component 318 can similarly indicate a disambiguation identifier in the newly defined message, and the transceiver component 320 can transmit the message to the wireless device 302. The selective release message component 202 can similarly receive the newly defined message, and the disambiguation identifier component 204 can determine a related disambiguation identifier. If the identifier indicates the wireless device 302 is to release its connection, according to the disambiguation identifier component 204 as described previously, the release component 206 can release, and/or the transceiver component 312 can transmit a related message.

Furthermore, in an example, a security and/or context check can be used as the selective release message. For example, upon the incorrect communication detect component 314 determining an erroneously connection wireless device 302 with conflicting identifier, the selective release message component can generate a security or context check message, such as a COUNTER CHECK message that is security or context specific. It is to be appreciated that a disambiguation identifier may not be needed in this case. The transceiver component 320 can transmit the security or context check message to the wireless devices 302 and 304. The selective release message component 202 can receive the security or context check, and the security/context check component 310 of the wireless device 302 can attempt to decode the security or context check. It likely cannot, since it has not established the requisite security or other context (e.g., since it has not completed setting up communications with the disparate access point 108). Since the wireless device 304 has setup a previous connection with the disparate access point 108, and is the correctly connected access point, however, it can decode the security or context check since it has likely received the related security or other context. The device unable to decode the security or context check can release its connection (e.g., via release component 206, as described) to the disparate access point 108.

Figure 4:
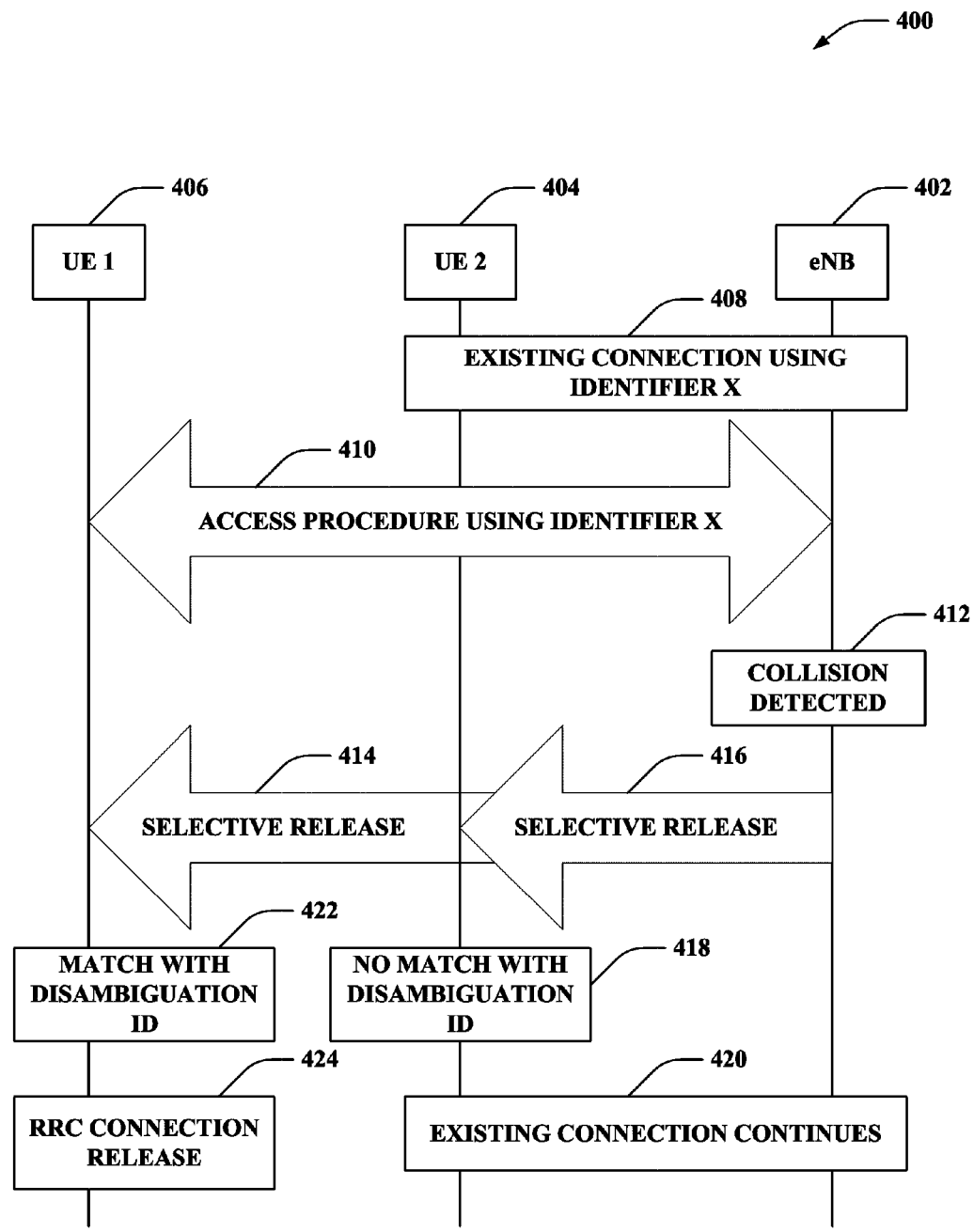
FIG. 4 illustrates an example wireless communication system that utilizes selective release messages for mobile devices with conflicting identifiers.

Referring to FIG. 4, an example wireless communications system 400 is illustrated that facilitates communication among an eNB and UEs to perform selective release. System 400 includes an eNB 402 that provides access to a wireless network. The eNB 402 is communicating with UE 2 404 over an existing connection using identifier X 408, as described. For example, UE 2 404 can have initialized communications with the eNB 402 at a previous point in time and received identifier X from eNB 402 to identify itself. UE 1 406 can be communicating with a disparate eNB (not shown) to perform handover to target eNB (not shown). UE 1 406 can be assigned identifier X by the target eNB, for example. In any case, UE 1 406 can attempt an access procedure to the eNB 402 using the identifier X 410.

eNB 402 can detect the collision 412. As described, this can include determining that UE 1 406 is sending access procedure messages, where eNB 402 would expect regular data or control messages from the correct UE (UE 2 404). Thus, eNB 402 knows that there is a conflict between UEs. In this regard, the eNB 402 sends selective release messages to UEs using identifier X, shown at 414 and 416. As described, the selective release message can be an existing or newly defined message and can comprise a disambiguation identifier, which can be related to the correctly or incorrectly connected UE. In another example, the selective release message can be a security or context check message. In either case, UE 1 406 and UE 2 404 receive the selective release message and can determine whether to release connection.

Where the message comprises a disambiguation identifier, such as one or more parameters or details of a previously sent message, UE 2 404 can determine no match with the disambiguation identifier 420 (e.g., where the disambiguation identifier relates to the incorrectly connected UE) and can continue its existing connection 420. Conversely, UE 1 406 can determine a match with the disambiguation identifier 422 (e.g., that a previous message or parameters related thereto matches the disambiguation identifier, an IMSI, S-TMSI, or P-TMSI matches the identifier, and/or the like, as described). Accordingly, UE 1 406 can perform an RRC connection release 424, as described. In another example, where the selective release messages 414 and 416 are security or context checks, the no match with disambiguation identifier step 418 can instead entail determining whether the check is decodable. If so, the existing connection continues 420, if not then the connection is released 424.

Figure 5:
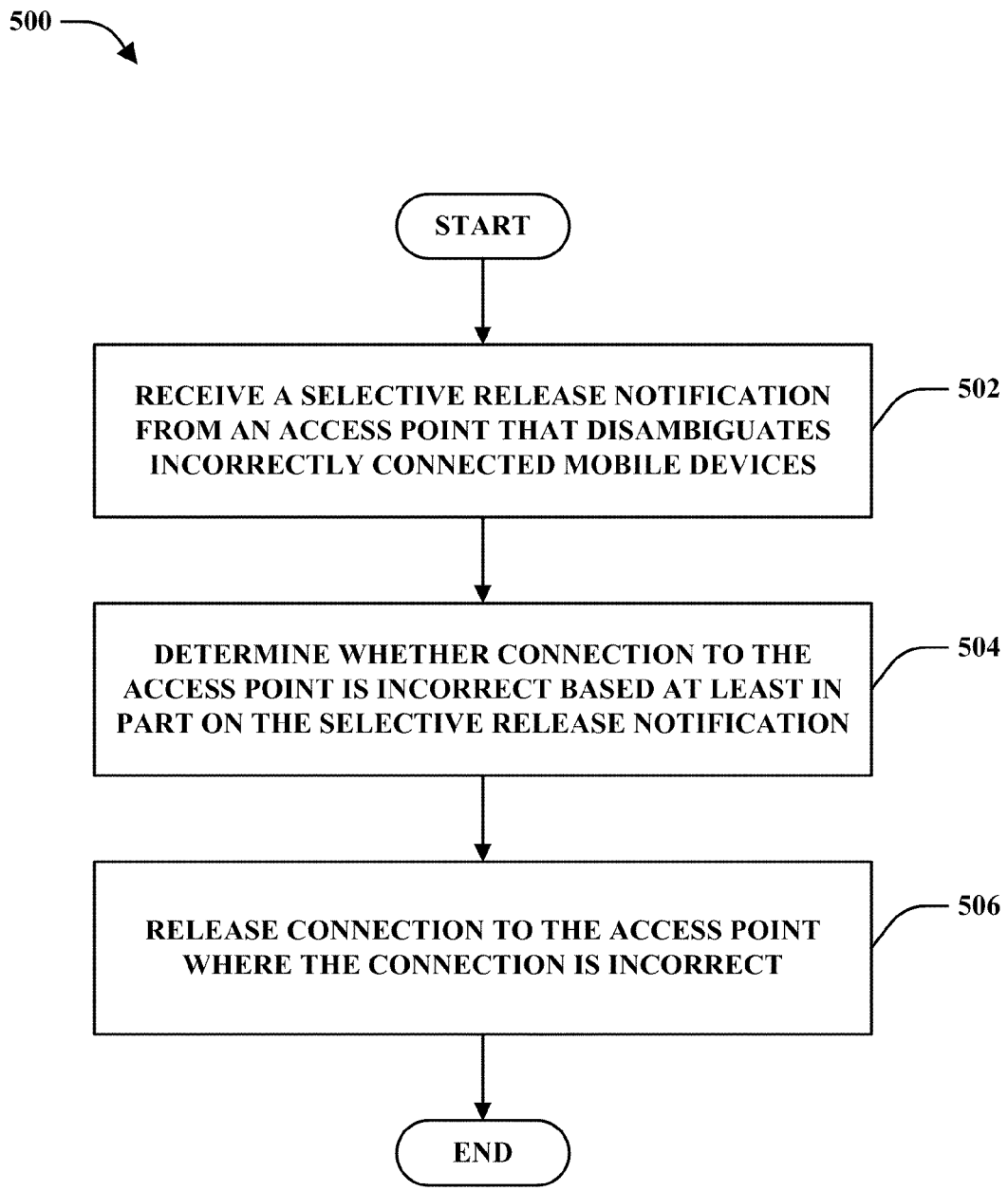
FIG. 5 is a flow diagram of an example methodology that facilitates processing selective release notifications.
Figure 6:
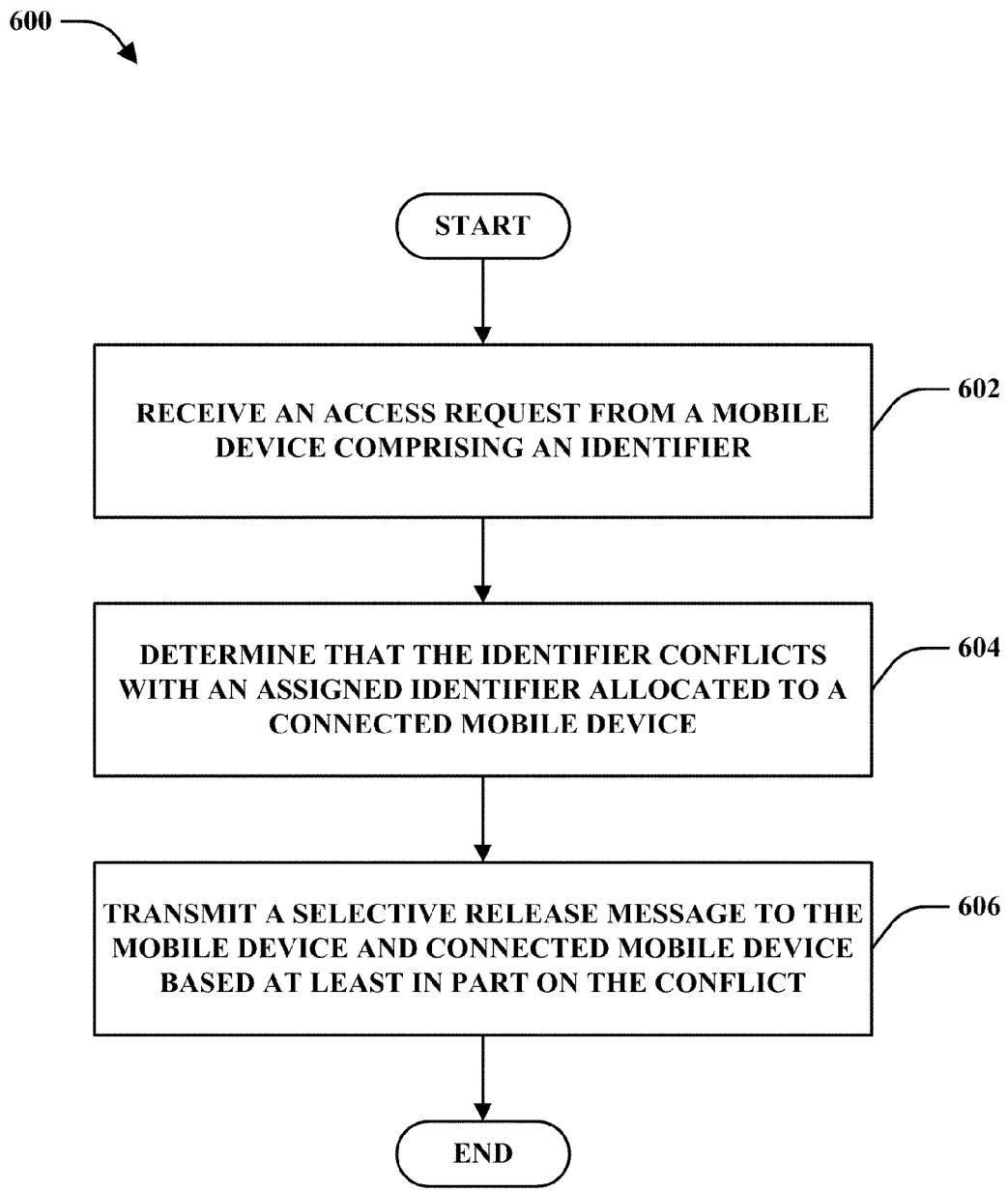
FIG. 6 is a flow diagram of an example methodology that transmits selective release messages to resolve identifier conflict.

Referring now to FIGS. 5-6, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 5, illustrated is a methodology 500 for processing selective release messages in wireless communications. At 502, a selective release notification can be received from an access point that disambiguates incorrectly connected mobile devices. As described, the selective release notification can be a general connection release message, such as RRC CONNECTION RELEASE or other radio layer message, or a newly defined message. In addition, the selective release notification can be a security or context check message. At 504, it can be determined whether connection to the access point is incorrect based at least in part on the selective release notification. This, as described, can include evaluating a disambiguation identifier in the notification against one or more aspects of a previous message, against a unique identifier, and/or the. As mentioned, a match with the disambiguation identifier can indicate that connection with the access point is incorrect, or vice versa. Where the selective release notification is a security or context check, this can include decoding the check; if the check is successfully decoded, for example, connection to the access point is likely not incorrect. At 506, connection to the access point can be released where the connection is incorrect, as determined in the previous step. Thus, release can be selective so as not to interrupt communication of the access point with a correctly connected mobile device.

Turning to FIG. 6, a methodology 600 is illustrated that facilitates transmitting selective release messages to mobile devices with conflicting identifiers. At 602, an access request comprising an identifier can be received from a mobile device. At 604, it can be determined that this identifier conflicts with an assigned identifier allocated to a connected mobile device. As described, for example, this can happen during handover where the mobile device selects the incorrect access point as a target access point. In addition, the conflict can be determined based on evaluating the access request and determining that an access request was not expected as a next communication from the connected mobile device related to the identifier. At 606, a selective release message can be transmitted to the mobile device and connected mobile device based at least in part on the conflict. As described, the selective release message can allow the mobile device and connected mobile device to identify whether they are correctly connected to the access point. The selective release message can comprise a disambiguation identifier, in this regard, related to one of the mobile devices; in another example, the nature of the message itself can disambiguate the devices (e.g., whether or not a security or context check can be decoded, as described).

It will be appreciated that, in accordance with one or more aspects described herein, inferences can be made regarding determining whether connection to an access point is correct or incorrect, applicability of a disambiguation identifier, and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 7:
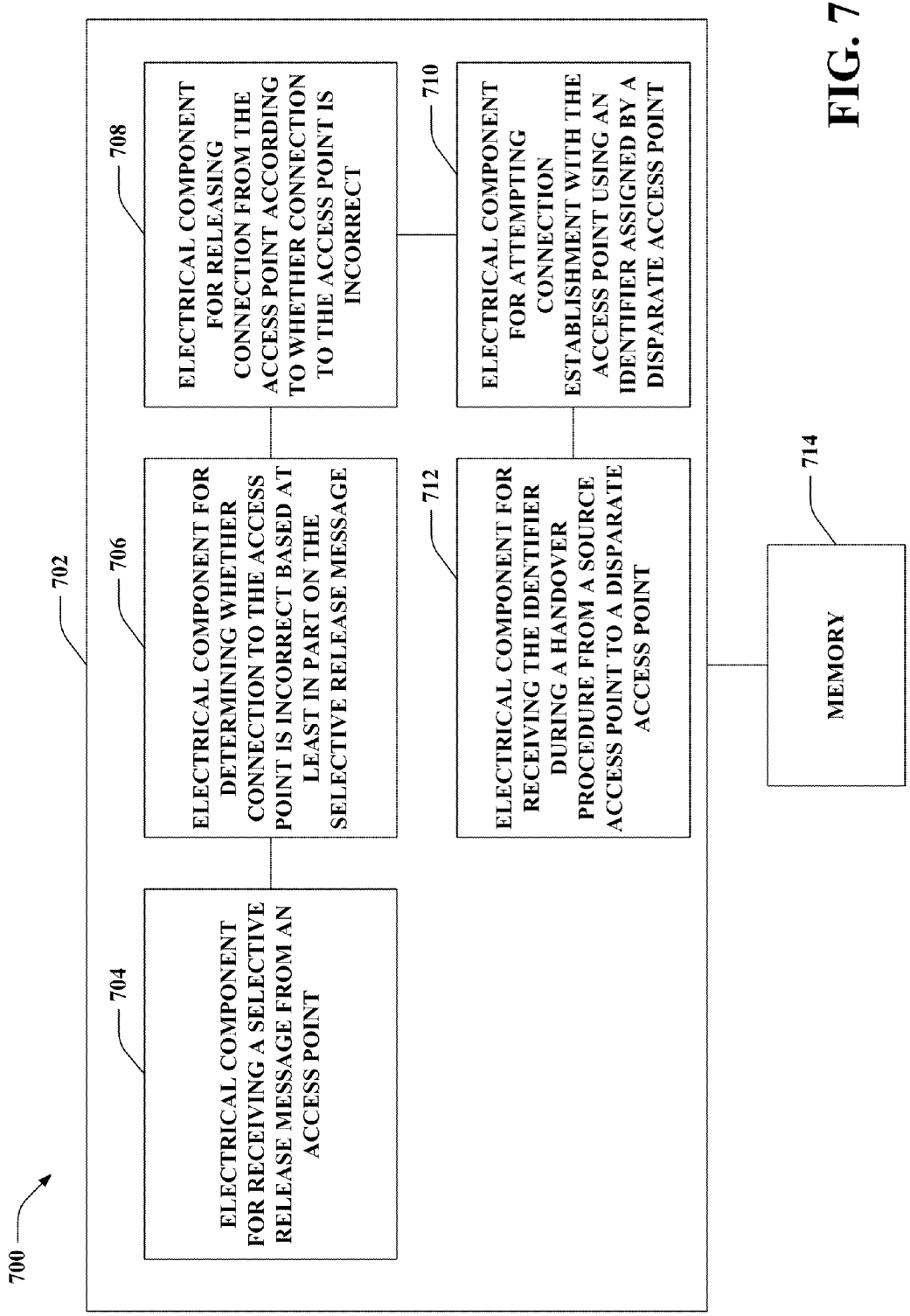
FIG. 7 is a block diagram of an example apparatus that performs selective release according to received messages.

With reference to FIG. 7, illustrated is a system 700 that processes selective release messages in a wireless network. For example, system 700 can reside at least partially within a base station, mobile device, or another device that provides access to a wireless network. It is to be appreciated that system 700 is represented as including functional blocks, which can be functional blocks that represent functions implemented by a processor, software, or combination thereof (e.g., firmware). System 700 includes a logical grouping 702 of electrical components that can act in conjunction. For instance, logical grouping 702 can include an electrical component for receiving a selective release message from an access point 704. As described, this can be a general connection release message with a selective indicator, a new message, a security or context check, etc. Further, logical grouping 702 can comprise an electrical component for determining whether connection to the access point is incorrect based at least in part on the selective release message 706. This, for example, can entail evaluating a disambiguation identifier in the message against one or more properties of the system 700 or a message transmitted to the access point by the system 700, a unique identifier, whether the security or context check can be decoded, etc.

Furthermore, logical grouping 702 can include an electrical component for releasing connection from the access point according to whether connection to the access point is incorrect 708. Thus, selective release is provided allowing access point communications to continue for a correctly connected mobile device. Moreover, logical grouping 702 can include an electrical component for attempting connection establishment with the access point using an identifier assigned by a disparate access point 710. As mentioned, this confusion by the mobile device can cause conflicting use of the identifier at the access point. Further, logical grouping 702 can include an electrical component for receiving the identifier during a handover procedure from a source access point to a disparate access point 712. Additionally, system 700 can include a memory 714 that retains instructions for executing functions associated with electrical components 704, 706, 708, 710, and 712. While shown as being external to memory 714, it is to be understood that one or more of electrical components 704, 706, 708, 710, and 712 can exist within memory 714.

Figure 8:
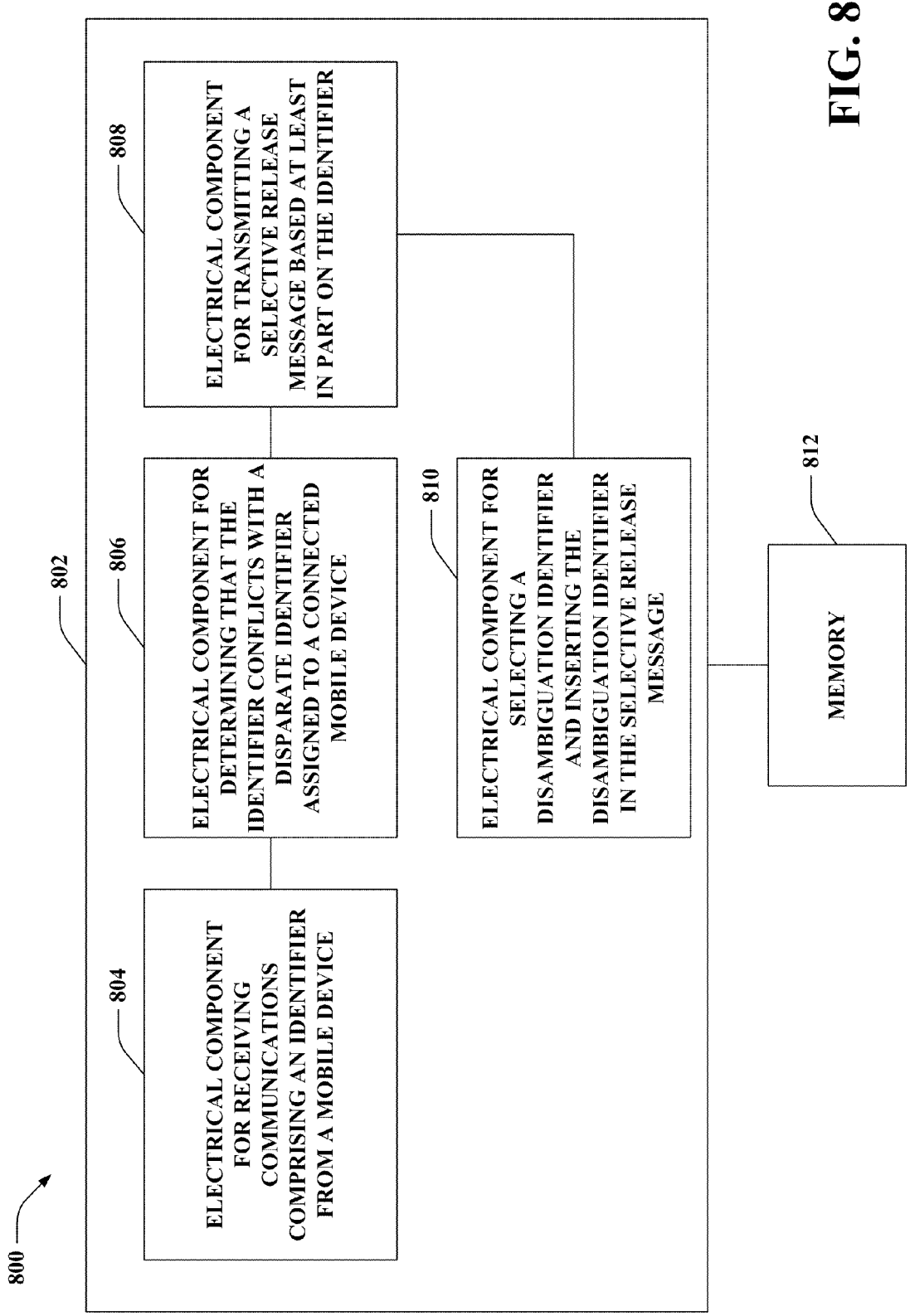
FIG. 8 is a block diagram of an example apparatus that facilitates transmitting selective release messages.

With reference to FIG. 8, illustrated is a system 800 that transmits selective release messages to mobile devices communicating with conflicting identifiers. For example, system 800 can reside at least partially within a base station, mobile device, etc. It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction. For instance, logical grouping 802 can include an electrical component for receiving communications comprising an identifier from a mobile device 804. In one example, the communications can relate to a request for access to the system 800. Further, logical grouping 802 can comprise an electrical component for determining that the identifier conflicts with a disparate identifier assigned to a connected mobile device 806. As described, this can include detecting that the communications received from the mobile device were not expected from the connected mobile device assigned to the identifier.

Moreover, logical grouping 802 includes an electrical component for transmitting a selective release message based at least in part on the identifier 808. For example, the selective release messages can be transmitted to all mobile devices connected to the access point using the identifier (e.g., the mobile device and connected mobile device). Thus, using functionalities described previously, one or more of the mobile devices can release its connection from the access point based on the message. The selective release message can be a general connection release message, a newly defined selective release message, a security or context check, etc., as described. Furthermore, logical grouping 802 can also include an electrical component for selecting a disambiguation identifier and inserting the disambiguation identifier in the selective release message 810. As described, the disambiguation identifier can be related to one or more unique aspects of the incorrectly or correctly connected mobile device, one or more unique aspects of one or more messages transmitted by either of the mobile devices, and/or the like. Additionally, system 800 can include a memory 812 that retains instructions for executing functions associated with electrical components 804, 806, 808 and 810. While shown as being external to memory 812, it is to be understood that one or more of electrical components 804, 806, 808 and 810 can exist within memory 812.

Figure 9:
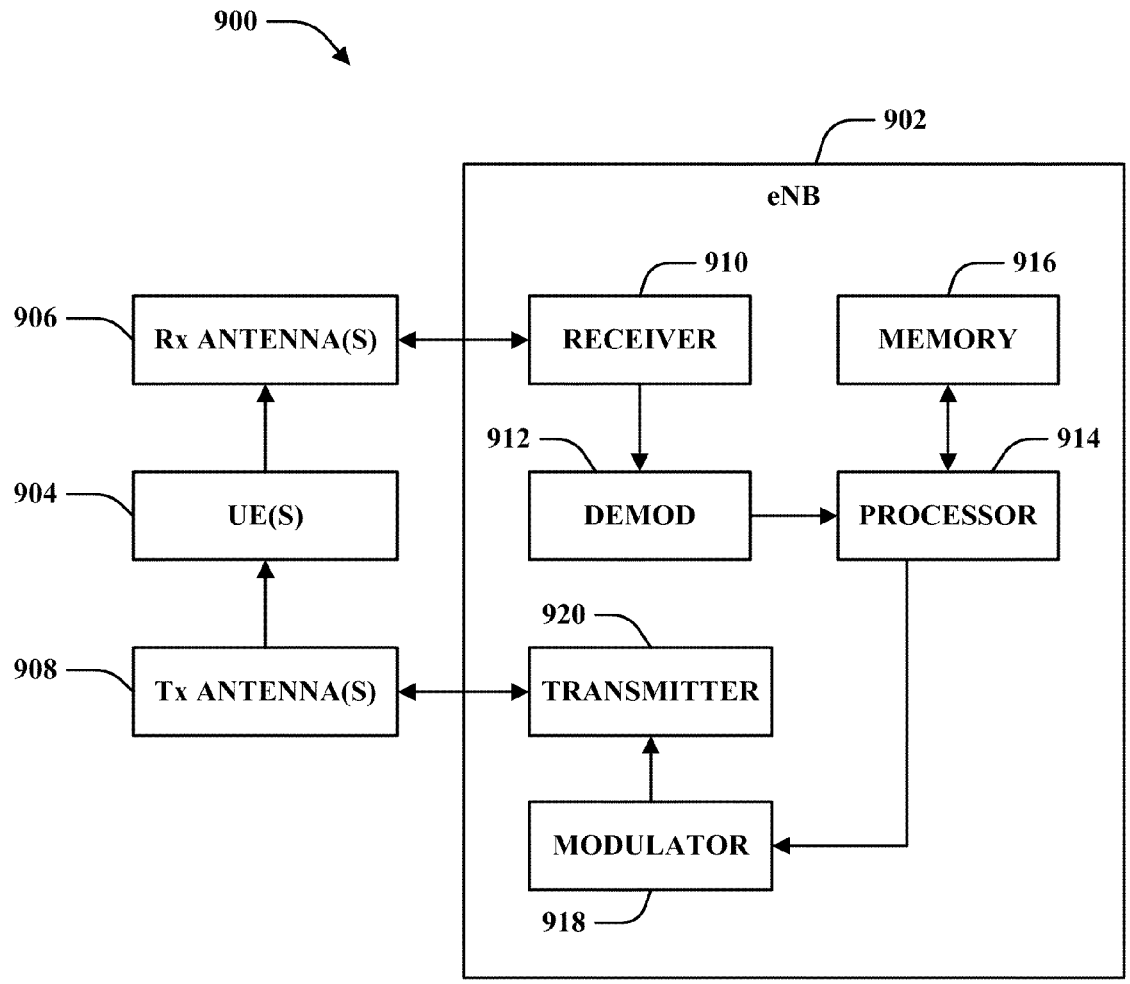
FIGS. 9-10 are block diagrams of example wireless communication devices that can be utilized to implement various aspects of the functionality described herein.

FIG. 9 is a block diagram of a system 900 that can be utilized to implement various aspects of the functionality described herein. In one example, system 900 includes a base station or eNB 902. As illustrated, eNB 902 can receive signal(s) from one or more UEs 904 via one or more receive (Rx) antennas 906 and transmit to the one or more UEs 904 via one or more transmit (Tx) antennas 908. Additionally, eNB 902 can comprise a receiver 910 that receives information from receive antenna(s) 906. In one example, the receiver 910 can be operatively associated with a demodulator (Demod) 912 that demodulates received information. Demodulated symbols can then be analyzed by a processor 914. Processor 914 can be coupled to memory 916, which can store information related to code clusters, access terminal assignments, lookup tables related thereto, unique scrambling sequences, and/or other suitable types of information. In one example, eNB 902 can employ processor 914 to perform methodologies 500, 600, and/or other similar and appropriate methodologies. eNB 902 can also include a modulator 918 that can multiplex a signal for transmission by a transmitter 920 through transmit antenna(s) 908.

Figure 10:
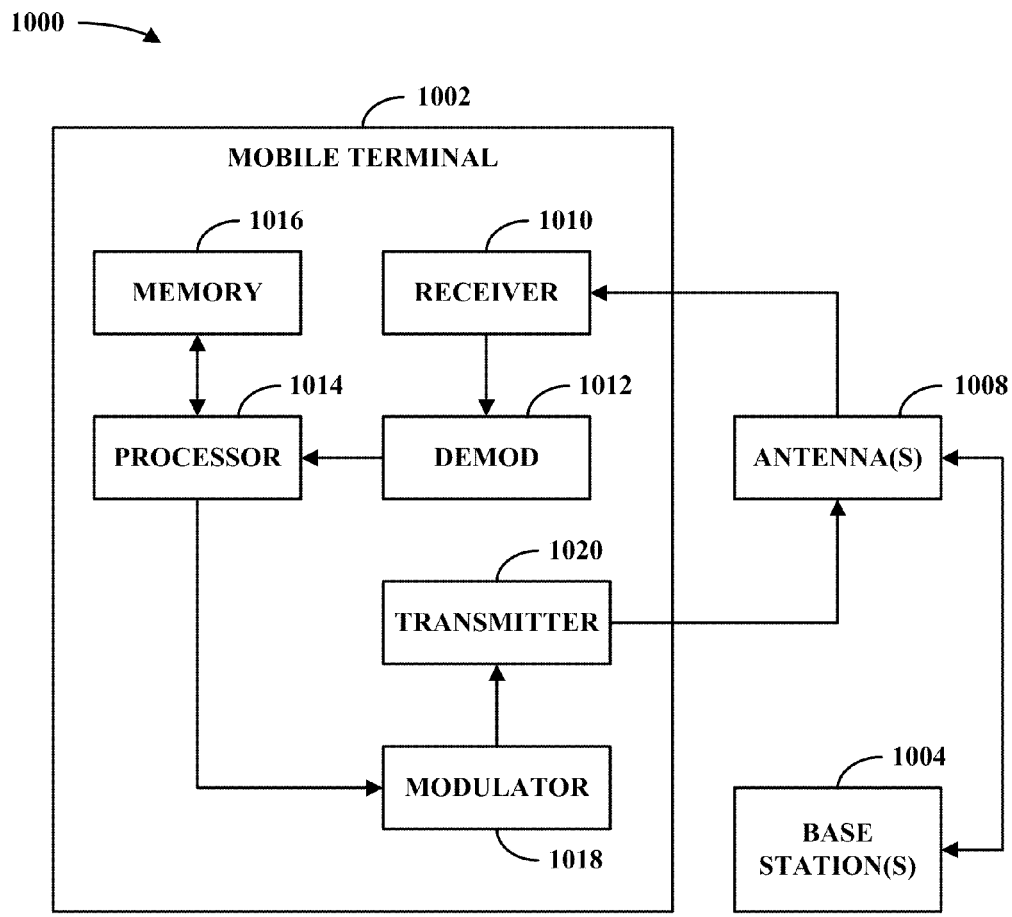

FIG. 10 is a block diagram of another system 1000 that can be utilized to implement various aspects of the functionality described herein. In one example, system 1000 includes a mobile terminal 1002. As illustrated, mobile terminal 1002 can receive signal(s) from one or more base stations 1004 and transmit to the one or more base stations 1004 via one or more antennas 1008. Additionally, mobile terminal 1002 can comprise a receiver 1010 that receives information from antenna(s) 1008. In one example, receiver 1010 can be operatively associated with a demodulator (Demod) 1012 that demodulates received information. Demodulated symbols can then be analyzed by a processor 1014. Processor 1014 can be coupled to memory 1016, which can store data and/or program codes related to mobile terminal 1002. Additionally, mobile terminal 1002 can employ processor 1014 to perform methodologies 500, 600, and/or other similar and appropriate methodologies. Mobile terminal 1002 can also employ one or more components described in previous figures to effectuate the described functionality; in one example, the components can be implemented by the processor 1014. Mobile terminal 1002 can also include a modulator 1018 that can multiplex a signal for transmission by a transmitter 1020 through antenna(s) 1008.

Figure 11:
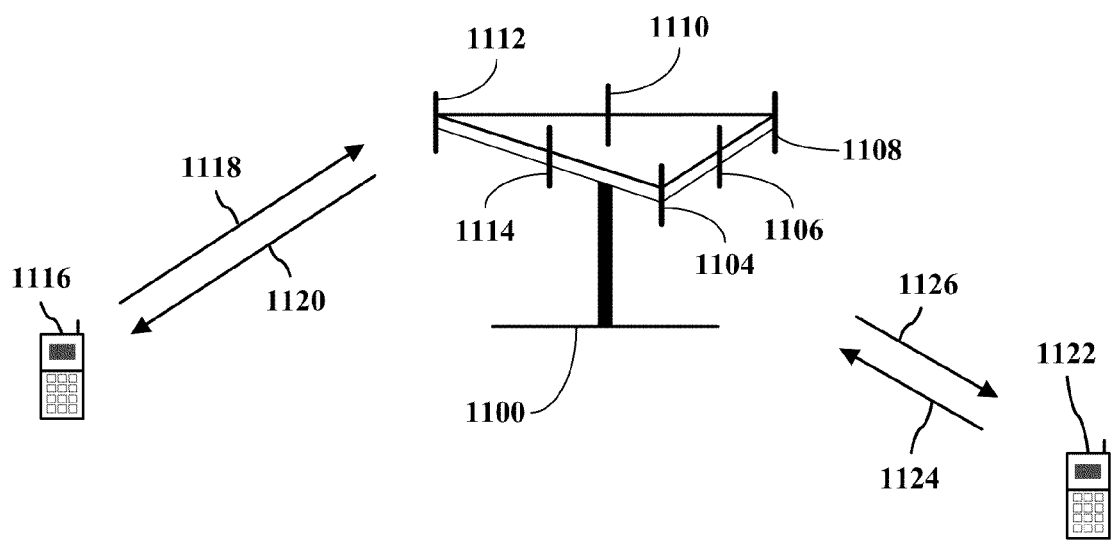
FIG. 11 illustrates an example wireless multiple-access communication system in accordance with various aspects set forth herein.

Referring now to FIG. 11, an illustration of a wireless multiple-access communication system is provided in accordance with various aspects. In one example, an access point 1100 (AP) includes multiple antenna groups. As illustrated in FIG. 11, one antenna group can include antennas 1104 and 1106, another can include antennas 1108 and 1110, and another can include antennas 1112 and 1114. While only two antennas are shown in FIG. 11 for each antenna group, it should be appreciated that more or fewer antennas may be utilized for each antenna group. In another example, an access terminal 1116 can be in communication with antennas 1112 and 1114, where antennas 1112 and 1114 transmit information to access terminal 1116 over forward link 1120 and receive information from access terminal 1116 over reverse link 1118. Additionally and/or alternatively, access terminal 1122 can be in communication with antennas 1106 and 1108, where antennas 1106 and 1108 transmit information to access terminal 1122 over forward link 1126 and receive information from access terminal 1122 over reverse link 1124. In a frequency division duplex system, communication links 1118, 1120, 1124 and 1126 can use different frequency for communication. For example, forward link 1120 may use a different frequency then that used by reverse link 1118.

Each group of antennas and/or the area in which they are designed to communicate can be referred to as a sector of the access point. In accordance with one aspect, antenna groups can be designed to communicate to access terminals in a sector of areas covered by access point 1100. In communication over forward links 1120 and 1126, the transmitting antennas of access point 1100 can utilize beamforming in order to improve the signal-to-noise ratio of forward links for the different access terminals 1116 and 1122. Also, an access point using beamforming to transmit to access terminals scattered randomly through its coverage causes less interference to access terminals in neighboring cells than an access point transmitting through a single antenna to all its access terminals.

An access point, e.g., access point 1100, can be a fixed station used for communicating with terminals and can also be referred to as a base station, an eNB, an access network, and/or other suitable terminology. In addition, an access terminal, e.g., an access terminal 1116 or 1122, can also be referred to as a mobile terminal, user equipment, a wireless communication device, a terminal, a wireless terminal, and/or other appropriate terminology.

Figure 12:
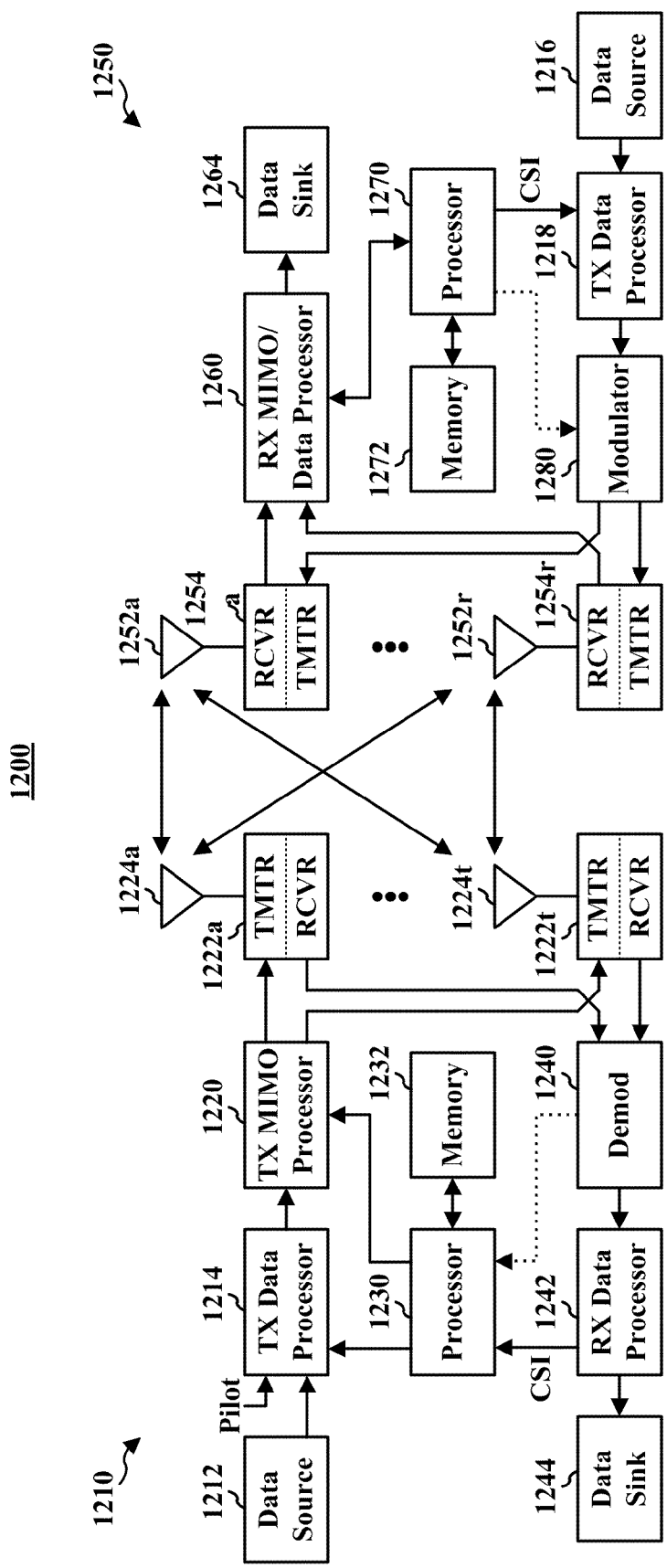
FIG. 12 is a block diagram illustrating an example wireless communication system in which various aspects described herein can function.

Referring now to FIG. 12, a block diagram illustrating an example wireless communication system 1200 in which various aspects described herein can function is provided. In one example, system 1200 is a multiple-input multiple-output (MIMO) system that includes a transmitter system 1210 and a receiver system 1250. It should be appreciated, however, that transmitter system 1210 and/or receiver system 1250 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1210 and/or receiver system 1250 described herein could be utilized in connection with a single output to single input antenna system.

In accordance with one aspect, traffic data for a number of data streams are provided at transmitter system 1210 from a data source 1212 to a transmit (TX) data processor 1214. In one example, each data stream can then be transmitted via a respective transmit antenna 1224. Additionally, TX data processor 1214 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1250 to estimate channel response. Back at transmitter system 1210, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1230.

Next, modulation symbols for all data streams can be provided to a TX processor 1220, which can further process the modulation symbols (e.g., for OFDM). TX MIMO processor 1220 can then provides $N_T$ modulation symbol streams to $N_T$ transceivers 1222a through 1222t. In one example, each transceiver 1222 can receive and process a respective symbol stream to provide one or more analog signals. Each transceiver 1222 can then further condition (e.g., amplify, filter, and upconvert) the analog signals to provide a modulated signal suitable for transmission over a MIMO channel. Accordingly, $N_T$ modulated signals from transceivers 1222a through 1222t can then be transmitted from $N_T$ antennas 1224a through 1224t, respectively.

In accordance with another aspect, the transmitted modulated signals can be received at receiver system 1250 by $N_R$ antennas 1252a through 1252r. The received signal from each antenna 1252 can then be provided to respective transceivers 1254. In one example, each transceiver 1254 can condition (e.g., filter, amplify, and downconvert) a respective received signal, digitize the conditioned signal to provide samples, and then processes the samples to provide a corresponding "received" symbol stream. An RX MIMO/data processor 1260 can then receive and process the $N_R$ received symbol streams from $N_R$ transceivers 1254 based on a particular receiver processing technique to provide $N_T$ "detected" symbol streams. In one example, each detected symbol stream can include symbols that are estimates of the modulation symbols transmitted for the corresponding data stream. RX processor 1260 can then process each symbol stream at least in part by demodulating, deinterleaving, and decoding each detected symbol stream to recover traffic data for a corresponding data stream. Thus, the processing by RX processor 1260 can be complementary to that performed by TX MIMO processor 1220 and TX data processor 1216 at transmitter system 1210. RX processor 1260 can additionally provide processed symbol streams to a data sink 1264.

In accordance with one aspect, the channel response estimate generated by RX processor 1260 can be used to perform space/time processing at the receiver, adjust power levels, change modulation rates or schemes, and/or other appropriate actions. Additionally, RX processor 1260 can further estimate channel characteristics such as, for example, signal-to-noise-and-interference ratios (SNRs) of the detected symbol streams. RX processor 1260 can then provide estimated channel characteristics to a processor 1270. In one example, RX processor 1260 and/or processor 1270 can further derive an estimate of the "operating" SNR for the system. Processor 1270 can then provide channel state information (CSI), which can comprise information regarding the communication link and/or the received data stream. This information can include, for example, the operating SNR. The CSI can then be processed by a TX data processor 1218, modulated by a modulator 1280, conditioned by transceivers 1254a through 1254r, and transmitted back to transmitter system 1210. In addition, a data source 1216 at receiver system 1250 can provide additional data to be processed by TX data processor 1218.

Back at transmitter system 1210, the modulated signals from receiver system 1250 can then be received by antennas 1224, conditioned by transceivers 1222, demodulated by a demodulator 1240, and processed by a RX data processor 1242 to recover the CSI reported by receiver system 1250. In one example, the reported CSI can then be provided to processor 1230 and used to determine data rates as well as coding and modulation schemes to be used for one or more data streams. The determined coding and modulation schemes can then be provided to transceivers 1222 for quantization and/or use in later transmissions to receiver system 1250. Additionally and/or alternatively, the reported CSI can be used by processor 1230 to generate various controls for TX data processor 1214 and TX MIMO processor 1220. In another example, CSI and/or other information processed by RX data processor 1242 can be provided to a data sink 1244.

In one example, processor 1230 at transmitter system 1210 and processor 1270 at receiver system 1250 direct operation at their respective systems. Additionally, memory 1232 at transmitter system 1210 and memory 1272 at receiver system 1250 can provide storage for program codes and data used by processors 1230 and 1270, respectively. Further, at receiver system 1250, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

Figure 13:
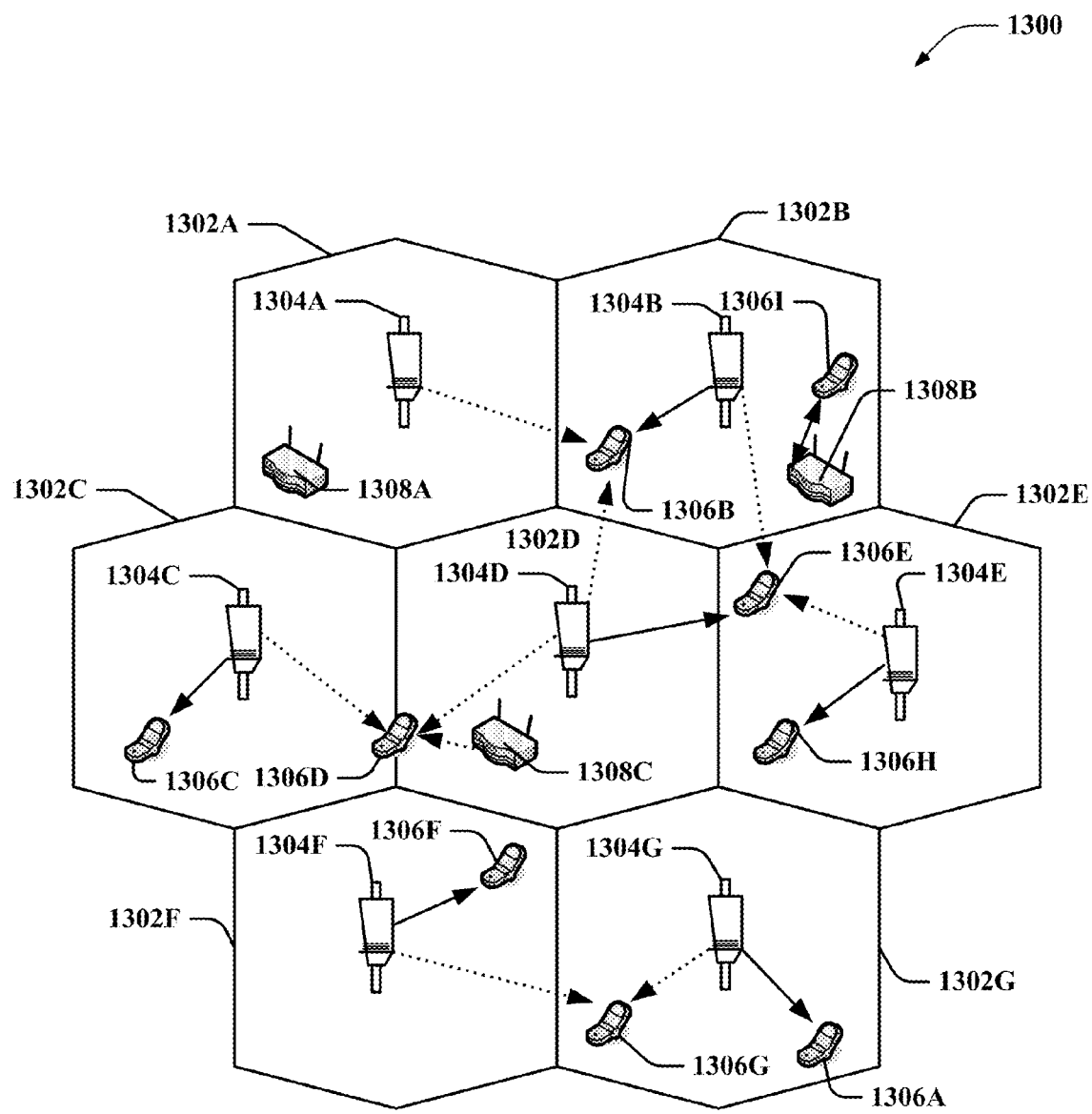
FIG. 13 is an illustration of a wireless communication network that can support and utilize various aspects described herein.

Now referring to FIG. 13, a wireless communication system 1300 configured to support a number of mobile devices is illustrated. The system 1300 provides communication for multiple cells, such as for example, macrocells 1302A-1302G, with each cell being serviced by a corresponding access point 1304A-1304G. As described previously, for instance, the access points 1304A-1304G related to the macrocells 1302A-1302G can be base stations. Mobile devices 1306A-1306I are shown dispersed at various locations throughout the wireless communication system 1300. Each mobile device 1306A-1306I can communicate with one or more access points 1304A-1304G on a forward link and/or a reverse link, as described. In addition, access points 1308A-1308C are shown. These can be smaller scale access points, such as femtocells, picocells, relay nodes, etc. offering services related to a particular service location, as described. The mobile devices 1306A-1306I can additionally communicate with these smaller scale access points 1308A-1308C to receive offered services. The wireless communication system 1300 can provide service over a large geographic region, in one example (e.g., macrocells 1302A-1302G can cover a few blocks in a neighborhood, and the femtocell access points 1308A-1308C can be present in areas such as residences, office buildings, and/or the like as described). In an example, the mobile devices 1306A-1306I can establish connection with the access points 1304A-1304G and/or 1308A-1308C over the air and/or over a backhaul connection.

Additionally, as shown, the mobile devices 1306A-1306I can travel throughout the system 1300 and can handover communications to (or reselect cells related to) the various access points 1304A-1304G and/or 1308A-1308C as it moves through the different macrocells 1302A-1302G or femtocell coverage areas. In one example, one or more of the mobile devices 1306A-1306I can be associated with a home femtocell related to at least one of femtocell access points 1308A-1308C. For example, mobile device 1306I can be associated with femtocell access point 1308B as its home femtocell (e.g. home eNB). Thus, though mobile device 1306I is in macrocell 1302B, and thus in coverage area of access point 1304B, it can communicate with the femtocell access point 1308B instead of (or in addition to) access point 1304B. In one example, the femtocell access point 1308B can provide additional services to the mobile device 1306I, such as desirable billing or charges, minute usage, enhanced services (e.g., faster broadband access, media services, etc.). Thus, when the mobile device 1306I is in range of the femtocell access point 1308B, it can favor the femtocell access point 1308B in reselection. In an example, some femtocell access points 1308A-1308C can have conflicting identifiers causing some mobile devices 1306A-1306I to handover to the incorrect femtocell access point, as described herein. The selective release functionality described above mitigates deleterious effects that can be caused by such incorrect handing over.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for performing selective release in wireless communications, comprising:

receiving, in a wireless device, a selective release notification from an access point that disambiguates incorrectly connected mobile devices;

determining, in the wireless device, whether an established connection to the access point is incorrect based at least in part on the selective release notification; and releasing, in the wireless device, the established connection to the access point based at least in part on determining, in the wireless device, whether connection to the access point is incorrect.

2. The method of claim 1, wherein the selective release notification comprises a disambiguation identifier related to mobile devices correctly or incorrectly connected to the access point.

3. The method of claim 2, wherein determining whether connection to the access point is incorrect is further based at least in part on comparing the disambiguation identifier to one or more aspects of a previous message transmitted to the access point.

4. The method of claim 3, wherein the one or more aspects of the previous message is a signature or checksum of the previous message.

5. The method of claim 2, wherein the selective release notification is an existing connection release message and further includes an indicator specifying selective release.

6. The method of claim 1, wherein the selective release notification is a security or context check message and determining whether connection to the access point is incorrect is based at least in part on successful or unsuccessful decoding of the security or context check message.

7. A wireless communications apparatus, comprising:
at least one processor configured to:
obtain a selective release notification from an access point;
detect whether the selective release notification applies to the wireless communications apparatus; and
detect a disambiguation identifier in the selective release message; and
release connection from the access point based at least in part on detecting whether the selective release notification applies; and
a memory coupled to the at least one processor.

8. The wireless communications apparatus of claim 7, wherein the at least one processor detects whether the selective release notification applies based at least in part on comparing the disambiguation identifier to an aspect of a previous message transmitted to the access point.

9. The wireless communications apparatus of claim 8, wherein the aspect is a signature or checksum of the message.

10. The wireless communications apparatus of claim 7, wherein the selective release message is a general connection release message and the at least one processor is further configured to determine that the general connection release message is selective based at least in part on an identifier in the message.

11. The wireless communications apparatus of claim 7, wherein the selective release notification is a security or context check message and the at least one processor detects whether the selective release notification applies based at least in part on successful or unsuccessful decoding of the security or context check message.

12. An apparatus that facilitates releasing communications in wireless networks, comprising:
means for receiving a selective release message from an access point;

means for determining whether connection to the access point is incorrect based at least in part on the selective release message; and means for releasing connection from the access point according to whether connection to the access point is incorrect.

13. The apparatus of claim 12, wherein the selective release message comprises a disambiguation identifier and the means for determining determines whether connection to the access point is incorrect based at least in part on the disambiguation identifier.

14. The apparatus of claim 13, wherein the means for determining determines whether connection to the access point is incorrect based at least in part on comparing the disambiguation identifier to one or more aspects of a previous message transmitted to the access point.

15. The apparatus of claim 14, wherein the one or more aspects of the previous message includes a signature or checksum of the message.

16. The apparatus of claim 13, wherein the selective release message is a general connection release message and the means for receiving the selective release message further determines the message is selective based at least in part on an identifier in the general connection release message.

17. The apparatus of claim 12, wherein the selective release message is a security or context check message and the means for determining determines whether connection to the access point is incorrect based at least in part on whether decoding of the security or context check message is successful or unsuccessful.

18. A computer program product, comprising:
a non-transitory computer-readable medium comprising:
code for causing at least one computer to receive a selective release notification from an access point that disambiguates incorrectly connected mobile devices;
code for causing the at least one computer to determine whether connection to the access point is incorrect based at least in part on the selective release notification; and
code for causing the at least one computer to release connection to the access point based at least in part on determining whether connection to the access point is incorrect.

19. The computer program product of claim 18, wherein the selective release notification comprises a disambiguation identifier related to mobile devices correctly or incorrectly connected to the access point.

20. The computer program product of claim 19, wherein determining whether connection to the access point is incorrect is further based at least in part on comparing the disambiguation identifier to one or more aspects of a previous message transmitted to the access point.

21. The computer program product of claim 20, wherein the one or more aspects of the previous message is a signature or checksum of the previous message.

22. The computer program product of claim 19, wherein the selective release notification is an existing connection release message and further includes an indicator specifying selective release.

23. The computer program product of claim 18, wherein the selective release notification is a security or context check message and determining whether connection to the access point is incorrect is based at least in part on successful or unsuccessful decoding of the security or context check message.

24. An apparatus, comprising:
a selective release message component that receives a selective release message from an access point;
a disambiguation identifier component that discerns whether connection to the access point is incorrect based at least in part on the selective release message; and
a release component that releases connection from the access point according to whether connection to the access point is incorrect.

25. The apparatus of claim 24, wherein the selective release message comprises a disambiguation identifier and the disambiguation identifier component determines whether connection to the access point is incorrect based at least in part on the disambiguation identifier.

26. The apparatus of claim 25, wherein the disambiguation identifier component determines whether connection to the access point is incorrect based at least in part on comparing the disambiguation identifier to one or more aspects of a previous message transmitted to the access point.

27. The apparatus of claim 26, wherein the one or more aspects of the previous message includes a signature or checksum of the message.

28. The apparatus of claim 25, wherein the selective release message is a general connection release message and the selective release message component further determines the message is selective based at least in part on an identifier in the general connection release message.

29. The apparatus of claim 24, wherein the selective release message is a security or context check message and the disambiguation identifier component determines whether connection to the access point is incorrect based at least in part on whether decoding of the security or context check message is successful or unsuccessful.

30. A method for selectively releasing mobile devices with conflicting identifiers, comprising:
receiving from a mobile device an access request comprising an identifier;
determining that the identifier conflicts with an assigned identifier previously allocated to a connected mobile device; and
transmitting a selective release message to the mobile device and connected mobile device based at least in part on the conflict between the identifier and the assigned identifier.

31. The method of claim 30, wherein determining that the identifier conflicts with the assigned identifier includes detecting the access request from the mobile device where a different message is expected from the connected mobile device.

32. The method of claim 30, wherein the selective release message is a general connection release message.

33. The method of claim 32, further comprising generating a disambiguation identifier of the mobile device or connected mobile device and including the disambiguation identifier in the selective release message.

34. The method of claim 33, wherein the disambiguation identifier relates to one or more parameters of the access request or a previous message received from the connected mobile device.

35. The method of claim 33, further comprising selecting a previous message received from the mobile device or the connected mobile device for generating the disambiguation identifier that avoids collision of the disambiguation identifier with a disparate disambiguation identifier corresponding to an additional message received from the mobile device or the connected mobile device.

36. The method of claim 33, further comprising including an indication that the general connection release message is for selective release in the selective release message.

37. The method of claim 30, further comprising generating a security or context check message, wherein the selective release message is the security or context check message.

38. A wireless communications apparatus, comprising:
at least one processor configured to:
obtain an access request comprising an identifier from a mobile device;
detect a conflict between the identifier and an assigned identifier allocated to a connected mobile device; and
transmit a selective release message corresponding to the conflicting identifier and assigned identifier; and
a memory coupled to the at least one processor.

39. The wireless communications apparatus of claim 38, wherein the at least one processor detects the conflict based at least in part on determining that the access request is an unexpected message for the assigned identifier.

40. The wireless communications apparatus of claim 38, wherein the selective release message is a general connection release message.

41. An apparatus that facilitates requesting selective release of one or more mobile devices, comprising:
means for receiving access request communications comprising an identifier from a first mobile device;
means for determining that the identifier conflicts with an assigned identifier previously allocated to a connected second mobile device; and
means for transmitting a selective release message to the first mobile device based at least in part on the assigned identifier.

42. The apparatus of claim 41, wherein the means for determining determines the identifier conflict based at least in part on detecting that the communications from the first mobile device are unexpected for the identifier.

43. The apparatus of claim 41, wherein the selective release message is a general connection release message.

44. The apparatus of claim 43, further comprising means for selecting a disambiguation identifier and inserting the disambiguation identifier in the selective release message.

45. The apparatus of claim 44, wherein the disambiguation identifier relates to the communications from the first mobile device or a previous message from the connected second mobile device.

46. A computer program product, comprising:
a non-transitory computer-readable medium comprising:
code for causing at least one computer to receive an access request from a first mobile device comprising an identifier;
code for causing the at least one computer to determine that the identifier conflicts with an assigned identifier previously allocated to a connected second mobile device; and
code for causing the at least one computer to transmit a selective release message to the first mobile device and the second connected mobile device based at least in part on the conflict between the identifier and the assigned identifier.

47. The computer program product of claim 46, wherein determining that the identifier conflicts with the assigned identifier includes detecting the access request from the first mobile device where a different message is expected from the connected second mobile device.

48. An apparatus, comprising:
a transceiver component that receives communications comprising an identifier from a first mobile device;
an incorrect communication detect component that determines the identifier conflicts with a disparate identifier assigned to a connected second mobile device; and
a selective release message component that generates a selective release message based at least in part on the identifier, wherein the transceiver component transmits the selective release message to the first mobile device and the connected second mobile device.

49. The apparatus of claim 48, wherein the incorrect communication detect component determines the identifier conflict based at least in part on detecting that the communications from the first mobile device are unexpected for the identifier.

* * * * *